US011569702B2

(12) United States Patent
Kobayashi

(10) Patent No.: US 11,569,702 B2
(45) Date of Patent: Jan. 31, 2023

(54) ON-VEHICLE BRUSHLESS MOTOR DEVICE AND METHOD OF MANUFACTURING THE SAME

(71) Applicant: MIKUNI CORPORATION, Tokyo (JP)

(72) Inventor: Tadashi Kobayashi, Takizawa (JP)

(73) Assignee: MIKUNI CORPORATION, Tokyo (JP)

( * ) Notice: Subject to any disclaimer, the term of this patent is extended or adjusted under 35 U.S.C. 154(b) by 224 days.

(21) Appl. No.: 16/893,920

(22) Filed: Jun. 5, 2020

(65) Prior Publication Data

US 2021/0013763 A1   Jan. 14, 2021

(30) Foreign Application Priority Data

Jul. 10, 2019  (JP) .............................. JP2019-128644

(51) Int. Cl.
| | | |
|---|---|---|
| *H02K 3/52* | (2006.01) | |
| *H02K 15/00* | (2006.01) | |
| *H02K 21/16* | (2006.01) | |

(52) U.S. Cl.
CPC ......... *H02K 3/522* (2013.01); *H02K 15/0062* (2013.01); *H02K 21/16* (2013.01)

(58) Field of Classification Search
CPC .... H02K 21/16; H02K 15/0062; H02K 11/33; H02K 3/522; H02K 5/225; H02K 29/08;
(Continued)

(56) References Cited

U.S. PATENT DOCUMENTS

2012/0307476 A1* 12/2012 Masuzawa ............. H02K 11/33
                                                                   361/816
2015/0171711 A1*  6/2015 Otsuka ................... H02K 5/225
                                                                   310/71
(Continued)

FOREIGN PATENT DOCUMENTS

DE   102011121943 A1   6/2013
DE   102016204968 A1   9/2017
(Continued)

OTHER PUBLICATIONS

Office Action issued in European Appln. No. 20180771.6 dated Jun. 30, 2022.
(Continued)

*Primary Examiner* — Ahmed Elnakib
*Assistant Examiner* — Leda T Pham
(74) *Attorney, Agent, or Firm* — Rossi, Kimms & McDowell LLP

(57) ABSTRACT

To provide an on-vehicle brushless motor device capable of being downsized with respect to an axial direction of a rotor and a method of manufacturing the same. The on-vehicle brushless motor device 1 includes a brushless motor 10 and an electronic substrate 30. The brushless motor 10 includes a rotor 12 and a stator 16 including a plurality of coils 18 arranged around the rotor 12. The electronic substrate 30 includes a through hole 34 penetrating in the axial direction X of the rotor 12 and includes a substrate body 32 arranged along a plane P intersecting the axial direction X on the side opposite to the output shaft of the brushless motor 10, and a terminal 40 fixed on the surface of the substrate body 32 on the side opposite to the rotor 12. A coil wire 20 of the coil 18 is inserted into the through hole 34 and is welded to the terminal 40 on the opposite side of the rotor 12 with respect to the substrate body 32.

13 Claims, 15 Drawing Sheets

(58) Field of Classification Search
CPC .......... H02K 3/52; H02K 1/146; H02K 15/02; H02K 1/185; H02K 15/022; H02K 15/095; H02K 3/38; H02K 1/187
See application file for complete search history.

(56) References Cited

U.S. PATENT DOCUMENTS

| | | | |
|---|---|---|---|
| 2015/0357886 A1 | 12/2015 | Ishizeki et al. | |
| 2016/0336831 A1* | 11/2016 | Horizumi | H02K 11/33 |
| 2016/0347354 A1* | 12/2016 | Asao | H02K 3/28 |

FOREIGN PATENT DOCUMENTS

| | | |
|---|---|---|
| DE | 102017207104 A1 | 10/2018 |
| JP | 2017015002 A | 1/2017 |

OTHER PUBLICATIONS

Extended European Search Report issued in European Appln. No. 20180771.6 dated Nov. 20, 2020.

* cited by examiner

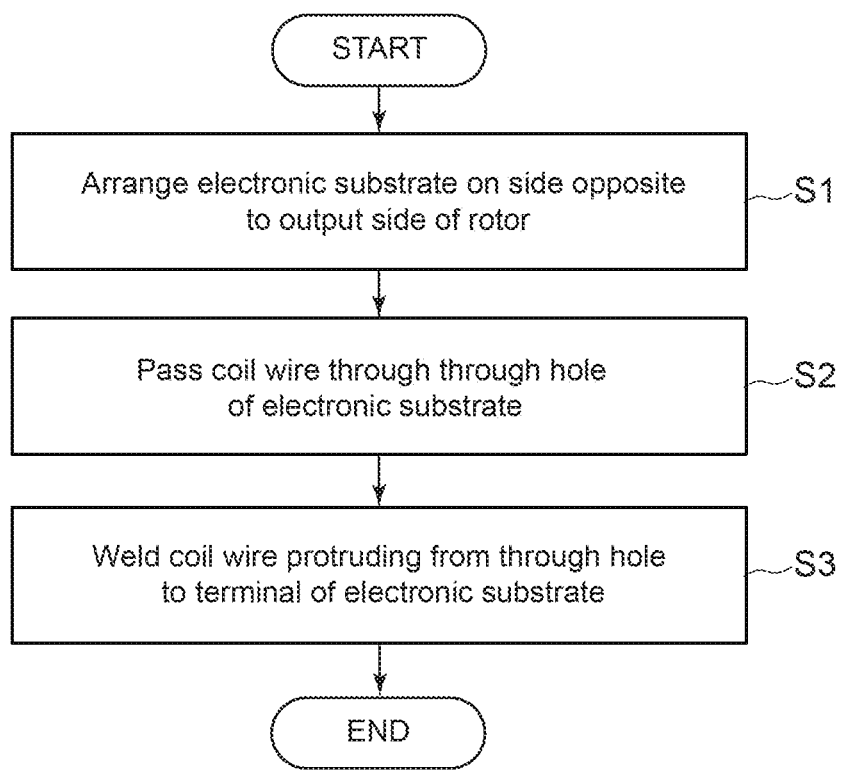

ON-VEHICLE BRUSHLESS MOTOR DEVICE AND METHOD OF MANUFACTURING THE SAME

TECHNICAL FIELD

The present disclosure relates to a brushless motor device mounted on a vehicle (hereinafter, called an on-vehicle brushless motor device) and a method of manufacturing the same.

BACKGROUND

In recent years, various brushless motors have been developed which do not use mechanical contacts such as brushes and commutators. For example, Patent Document 1 discloses a configuration related to a pump device including a brushless motor.

CITATION LIST

Patent Literature

Patent Document 1: Japanese Patent Application Laid-open No. 2017-15002

SUMMARY

By the way, an electric actuator to be mounted on a vehicle is desired to be miniaturized due to limitation of a space for mounting the electric actuator. However, in the pump device described in Patent Document 1, a driving coil and a circuit board are connected to each other through a terminal pin arranged along an axial direction of a rotor by soldering one end of the terminal pin having the other end electrically connected to the driving coil to the circuit board. Therefore, in the axial direction of the rotor, it is required to secure a space for soldering the terminal pin to the circuit board in addition to a space for arranging the terminal pin. Thus, it is difficult to reduce the size of the entire pump device in the axial direction of the rotor. Patent Document 1 does not disclose any solution for solving such a problem.

In view of the foregoing, it is an object of at least one embodiment of the present disclosure to provide an on-vehicle brushless motor device that can be miniaturized in the axial direction of the rotor and a method of manufacturing the same.

(1) An on-vehicle brushless motor device according to at least one embodiment of the present invention includes a brushless motor including a rotor and a stator which include a plurality of coils arranged around the rotor; and an electronic substrate including a substrate body provided with a through hole penetrating in the axial direction of the rotor and arranged along a plane intersecting the axial direction on the side opposite to the output side of the brushless motor, and a terminal fixed on a surface of the substrate body opposite to the rotor. Here, a coil wire of the coil is inserted through the through hole and welded to the terminal on a side opposite to the rotor with respect to the substrate body.

(2) In some embodiments, in the configuration described above as (1), a first slit extending along a first direction included in the plane may be formed in the terminal, the terminal may include a first terminal portion provided on one side and a second terminal portion provided on the other side with the first slit interposed therebetween, a third terminal portion connecting the first terminal portion and the second terminal portion, and a protruding portion provided to protrude from the second terminal portion to the opposite side to the rotor in the axial direction, the protruding portion may be welded to the coil wire, and the first terminal portion may be connected to the substrate body via a first soldering portion.

(3) In some embodiments, in the configuration described above as (2), the second terminal portion may be connected to the substrate body via a second soldering portion, and the first soldering portion and the second soldering portion may be separated from each other.

(4) In some embodiments, in the configuration described above as (2) or (3), the third terminal portion may be connected to one end portion of the second terminal portion in the first direction, and the protruding portion may be connected to the other end portion of the second terminal portion in the first direction.

(5) In some embodiments, in the configuration described above as any one of (2) to (4), the protruding portion may include a hook portion formed in a hook shape and welded to the coil wire by fusing.

(6) In some embodiments, in the configuration described above as any one of (2) to (5), the length of the second terminal portion in the first direction may be longer than the length of the first terminal portion in the first direction.

(7) In some embodiments, in the configuration described above as (3), the electronic substrate may include a metal foil terminal portion arranged adjacent to the through hole and disposed along a surface of the substrate body opposite to the rotor, and a resist disposed on the metal foil terminal portion and including a first opening corresponding to the first soldering portion and a second opening corresponding to the second soldering portion, a second slit extending in the first direction may be formed in the metal foil terminal portion, and the metal foil terminal portion may include a first portion provided on one side and a second portion provided on the other side with the second slit interposed therebetween, and a third portion connecting the first portion and the second portion. Here, the first portion may be connected to the first soldering portion in the first opening and second portion being connected to the second soldering portion in the second opening.

(8) In some embodiments, in the configuration described above as (7), an area of the second portion may be larger than an area of the first portion.

(9) In some embodiments, in the configuration described above as (8), the area of the second portion may be 1.2 times or more the area of the first portion.

(10) In some embodiments, in the configuration described above as any one of (1) to (9), the electronic substrate may include a plurality of the terminals, and the terminals may be oriented in the same direction with respect to the substrate body.

(11) In some embodiments, in the configuration described above as any one of (1) to (10), the on-vehicle brushless motor device may further include a holder unit including a connector terminal for connecting the electronic substrate and an external device and a holder disposed between the substrate body and the brushless motor to support the electronic board, and the electronic substrate may include a third soldering portion for being connected to the connector terminal.

(12) In some embodiments, in the configuration described above as (11), the holder may include a guide hole penetrating the holder in the axial direction and guiding the coil wire from the brushless motor side to the through hole of the substrate body.

(13) In some embodiments, in the configuration described above as (12), the guide hole may include a tapered passage portion formed such that a hole diameter decreases as a distance from the rotor in the axial direction increases.

(14) In some embodiments, in the configuration described above as (12) or (13), the diameter of an opening end of the guide hole on the electronic substrate side may be smaller than the diameter of the through hole.

(15) A method of manufacturing an on-vehicle brushless motor device according to at least one embodiment of the present invention includes steps of arranging a substrate body of an electronic substrate on a side opposite to an output side of a brushless motor along a plane intersecting an axial direction of a rotor of the brushless motor, passing a coil wire of a coil constituting a stator of the brushless motor through a through hole of the electronic substrate, and welding the coil wire to a terminal fixed on a surface of the substrate body opposite to the rotor on a side opposite to the rotor with respect to the electronic substrate.

According to at least one embodiment of the present disclosure, it is possible to provide an on-vehicle brushless motor device which can be miniaturized in the axial direction of the rotor and a method of manufacturing the same.

BRIEF DESCRIPTION OF DRAWINGS

FIG. 15 is a flowchart illustrating a method of manufacturing an on-vehicle brushless motor device according to an embodiment.

DETAILED DESCRIPTION

Embodiments of the present invention will now be described in detail with reference to the accompanying drawings. It is intended, however, that unless particularly specified, dimensions, materials, shapes, relative positions and the like of components described in the embodiments shall be interpreted as illustrative only and not limitative of the scope of the present invention.

For example, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For example, an expression of an equal state such as "same", "equal" and "uniform" shall not be construed as indicating only the state in which the feature is strictly equal, but also includes a state in which there is a tolerance or a difference that can still achieve the same function.

Further, for example, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

Figure 1:
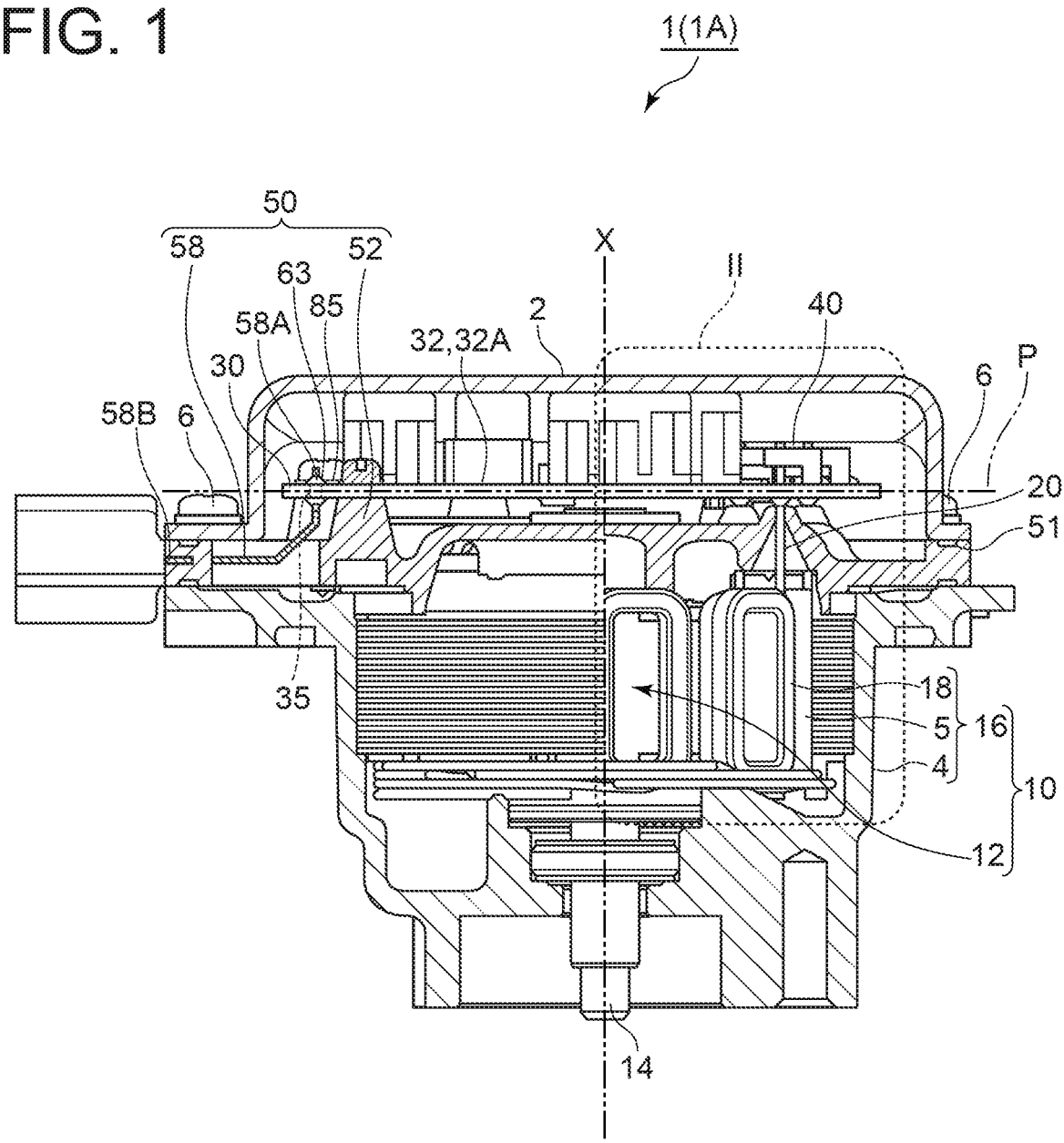
FIG. 1 is a view schematically illustrating a configuration example of an on-vehicle brushless motor device according to an embodiment of the present disclosure.
Figure 2A:
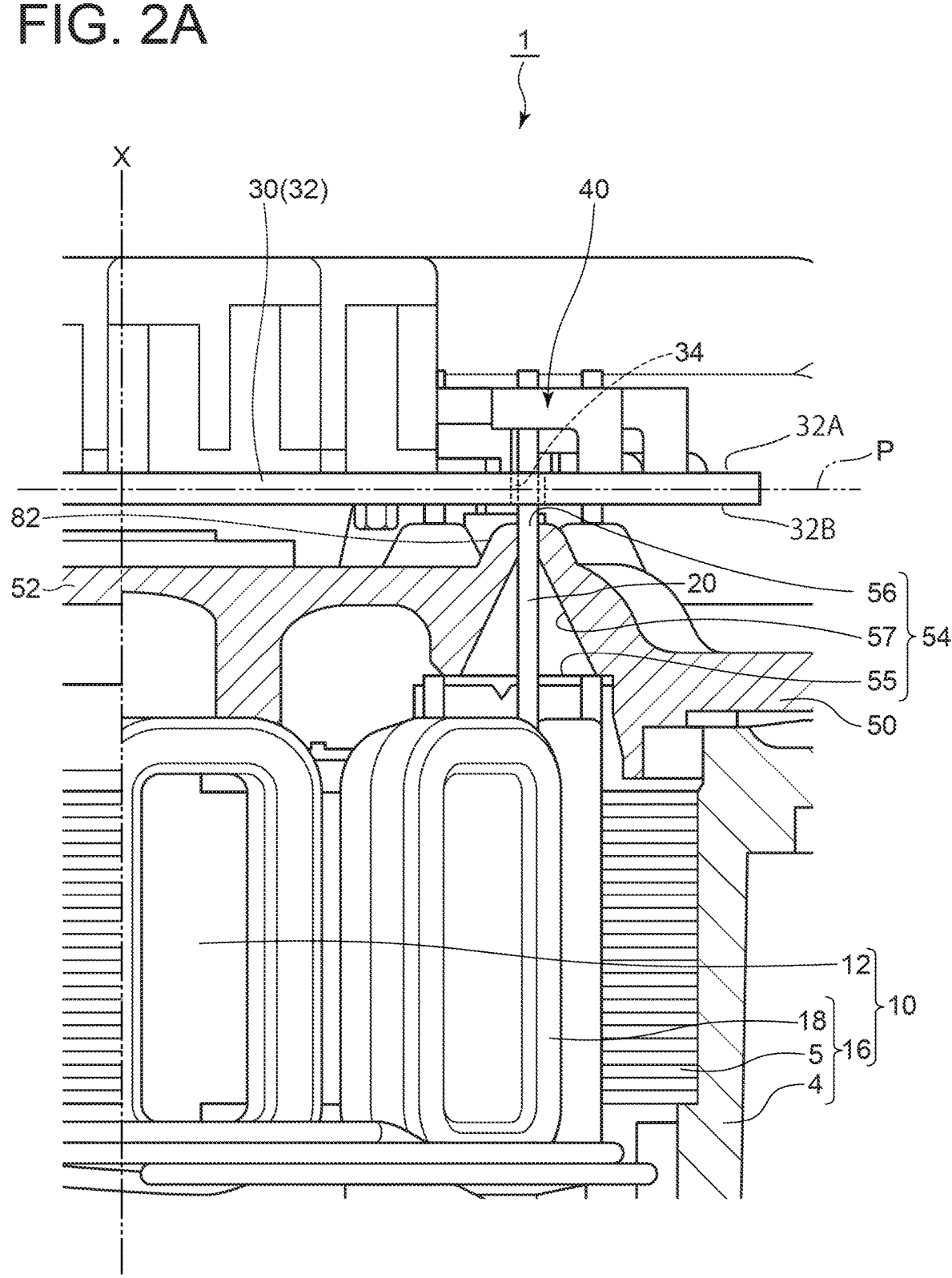
FIG. 2A is a partial enlarged view illustrating a region II indicated by a broken line in FIG. 1.

First, description will be provided on a schematic configuration of an on-vehicle brushless motor device 1 according to an embodiment of the present disclosure. FIG. 1 is a view schematically illustrating a configuration example of the on-vehicle brushless motor device 1 according to an embodiment of the present disclosure. FIG. 2A is a partial enlarged view illustrating a region II illustrated by a broken line in FIG. 1.

As illustrated in FIGS. 1 and 2A, the on-vehicle brushless motor device 1 is mounted, for example, on a vehicle as an electric oil pump (EOP) that is an electric oil supply device to supply oil for lubrication, cooling, or working fluid to an engine, a clutch, or the like. The on-vehicle brushless motor device 1 includes a brushless motor 10 that does not use a mechanical contact such as a brush or a commutator, and an electronic substrate 30 for controlling driving of the brushless motor 10.

The brushless motor 10 is an inner rotor type brushless motor including, for example, a rotor 12 and a stator 16 including a plurality of coils 18 arranged around the rotor 12.

Figure 2B:
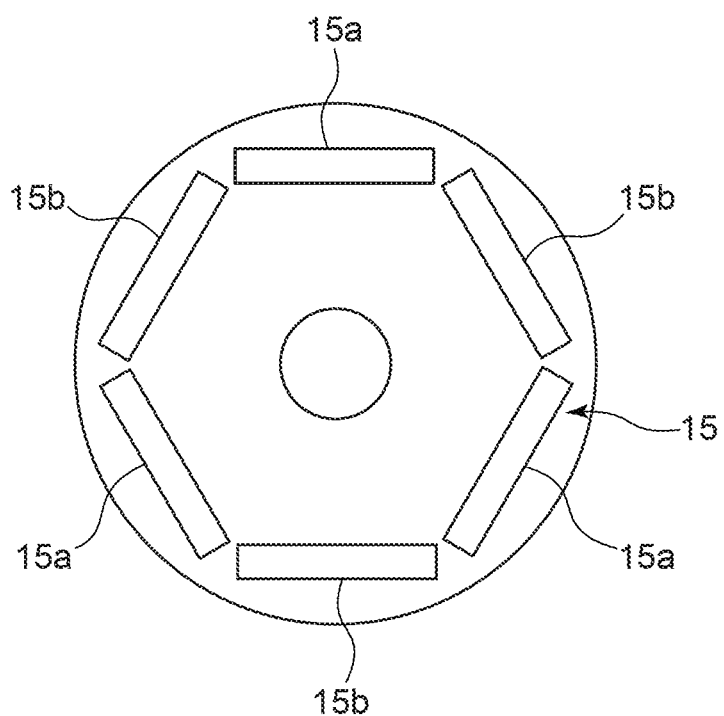
FIG. 2B is a view illustrating an example of arrangement of magnets.

The rotor 12 is arranged inside the stator 16 and formed, in a coaxial manner, of an output shaft 14 (rotary shaft), a cylindrical rotor core (not illustrated) arranged in the outer circumference of the output shaft 14, and a ring-shaped magnet 15 (see FIG. 2B) magnetized in multiple poles (e.g., six poles) and fixed to the rotor core along the outer circumference thereof. In the exemplary embodiment illustrated in FIG. 2B, plate-like S-pole magnet portions 15a and plate-like N-pole magnet portions 15b are alternately arranged in the circumferential direction, and six magnet portions 15a and 15b (three magnet portions 15a and three magnet portions 15b) are arranged to form a substantially hexagonal shape when viewed in the axial direction of the rotor 12. A pump rotor (not illustrated) such as a gear (not illustrated) for transporting oil is connected to the output shaft 14 to be rotatable together with the output shaft 14.

Hereinafter, the axial direction of the rotor 12 is referred to as an "axial direction X". In addition, a direction from the electronic substrate 30 toward the brushless motor 10 (a direction from the opposite side to the output side of the brushless motor 10 toward the output side of the brushless motor 10) in the axial direction X is referred to as "downward direction" or simply "downward", and a direction from the brushless motor 10 toward the electronic substrate 30 (a direction from the output side of the brushless motor 10 toward the opposite side to the output side of the brushless motor 10) in the axial direction X is referred to as "upward direction" or simply "upward".

The stator 16 includes a housing (motor case) 4 also serving as a yoke, a plurality of stator cores (core members) 5 fixed to an inner peripheral side of the housing 4, and the plurality of coils 18 each wound around the plurality of stator cores 5. The housing 4 is made of metal such as iron and has a bottomed cylindrical shape. A holder unit 50 (described later) made of, for example, synthetic resin is attached to an opening of the housing 4. The electronic substrate 30 is attached to an upper portion of the holder unit 50, and an upper portion of the electronic substrate 30 is covered with a top cover 2. The housing 4, the holder unit 50, and the top cover 2 are fixed by screws 6. Each coil 18 is formed by winding a conductive metal wire such as copper around the stator core 5 a plurality of times.

The electronic substrate 30 includes a substrate body 32 arranged along a plane P intersecting the axial direction X on the opposite side to the output side of the brushless motor 10, and a terminal 40 fixed on a surface 32A of the substrate body 32 on the opposite side to the rotor 12. In the illustrated exemplary embodiment, the plane P is orthogonal to the axial direction X. A through hole 34 penetrating in the axial direction X is formed in the substrate body 32. Hereinafter, the surface 32A of the substrate body 32 opposite to the rotor 12 is referred to as the "upper surface 32A" of the substrate body 32, and the surface of the substrate body 32 on the side of the rotor 12 is referred to as the "lower surface 32B" of the substrate body 32.

The substrate body 32 is a so-called printed circuit board (PCB), and is a printed-circuit board configured by mounting various electronic components on a printed wiring board (PWB) such as a glass epoxy substrate formed of a fiber-reinforced resin obtained by hardening cloth woven using glass fibers or the like with an epoxy resin. The printed wiring board may be, for example, a composite substrate in which paper and a glass substrate are mixed, a flexible substrate, or a ceramic substrate.

The through hole 34 is formed from the lower surface 32B to the upper surface 32A of the substrate body 32. The cross-sectional shape of the through hole 34 orthogonal to the axial direction X is formed, for example, in a circular shape.

The terminal 40 is a conductive member formed of a metal such as copper, and is connected to a coil wire 20 to electrically connect the electronic substrate 30 and the coil 18. The coil wire 20 of the coil 18 is inserted into the through hole 34, and is welded to the terminal 40 by fusing on the opposite side of the rotor 12 with the substrate body 32 interposed therebetween.

Here, an on-vehicle electric oil pump to which the on-vehicle brushless motor device 1 is applied may be disposed adjacent to a drive shaft or the like in the axial direction X. Therefore, if the on-vehicle brushless motor device 1 can be downsized in the axial direction X, it is possible to avoid interference with a movable portion such as a drive shaft, and the degree of freedom of design is improved.

In this regard, according to the configuration of the present disclosure described above, the coil wire 20 of the coil 18 is directly welded to the terminal 40 on the side opposite to the rotor 12 with the substrate body 32 interposed therebetween. Therefore, the distance between the electronic substrate 30 and the winding portion of the coil 18 can be reduced as compared with the case where the coil and the electronic substrate are connected to each other via a component such as a rigid terminal pin disposed between the electronic substrate and the coil, for example, and it is possible to provide the on-vehicle brushless motor device 1 that can be downsized in the axial direction X. In addition, the number of welding points can be reduced as compared with the case where the coil and the electronic substrate are connected to each other via a terminal pin. Therefore, it is possible to provide the on-vehicle brushless motor device 1 with improved assemblability.

In some embodiments, for example, as illustrated in FIGS. 1 and 2A, the on-vehicle brushless motor device 1 described above may further include the holder unit 50 including a connector terminal 58 for connecting the substrate body 32 and an external device (not illustrated), and a holder 52 disposed between the electronic substrate 30 and the brushless motor 10 to support the electronic substrate 30.

The holder 52 functions as a partition member that partitions a space in which the brushless motor 10 is disposed and a space in which the electronic substrate 30 is disposed, and also functions as a support portion that rotatably supports the output shaft 14 of the brushless motor 10 via a bearing (not illustrated). The holder 52 is made of resin, and for example, may be formed by insert molding. For example, as illustrated in FIG. 1, the holder 52 includes a groove portion 51 formed along the outer circumference of the holder 52 in the peripheral edge portion on the upper surface side. By filling the adhesive in the groove portion 51, it is possible to ensure airtightness between the space in which the electronic substrate 30 is disposed and the outside of the on-vehicle brushless motor device 1.

The connector terminal 58 is formed integrally with the holder 52 by embedding a part of the connector terminal 58 in the holder 52. For example, the holder unit 50 is formed by insert-molding the holder 52 with a part of the connector terminal 58 embedded therein. One end 58A of the connector terminal 58 is provided to protrude upward from the upper surface of the holder 52, and is connected to the electronic substrate 30 disposed above by soldering, for example. The other end 58B of the connector terminal 58 is provided in a state of projecting, for example, in the horizontal direction from the peripheral edge portion of the holder 52. The connector terminal 58 is a conductive member formed of a metal such as copper, for example, and the other end 58B thereof is connected to an external device (not illustrated), thereby electrically connecting the electronic substrate 30 and the external device. Note that the other end 58B of the connector terminal 58 may be provided to protrude upward or downward from the peripheral edge portion of the holder 52, for example, in accordance with the relative arrangement with the external device to be connected.

For example, a third soldering portion 63 may be provided to connect the one end 58A of the connector terminal 58 provided to protrude upward from the upper surface 32A of the substrate body 32 through the through hole 35 penetrating the substrate body 32 in the axial direction X and a metal foil terminal portion 85 provided on the upper surface 32A of the substrate body 32.

According to the on-vehicle brushless motor device 1, since the holder unit 50 in which the holder 52 and the connector terminal 58 are integrally formed is provided between the electronic substrate 30 and the brushless motor 10, it is possible to provide the on-vehicle brushless motor device 1 in which the electronic substrate 30 and the external device can be easily connected to each other while the electronic substrate 30 arranged on the opposite side of the rotor 12 with the holder unit 50 interposed therebetween is supported by the holder 52 and which is easy to be assembled. Further, according to the configuration of connecting the connector terminal 58 and a metal foil terminal portion 70 via the third soldering portion 63, soldering can be performed from above the substrate body 32. Therefore, it is possible to provide the on-vehicle brushless motor device 1 with improved assemblability.

In some embodiments, for example, as illustrated in FIGS. 1 and 2A, in the configuration of including the holder unit 50 described above, the holder 52 may include a guide hole 54 for guiding the coil wire 20 from the brushless motor 10 side to the through hole 34 of the substrate body 32 as penetrating the holder 52 in the axial direction X.

The guide hole 54 is formed to penetrate the holder 52 in the axial direction X from the lower surface side to the upper surface side of the holder 52. The cross-sectional shape of the guide hole 54 orthogonal to the axial direction X is formed, for example, in a circular shape. The guide hole 54 is formed such that a substrate-side opening end 56, which is an opening end of the guide hole 54 on the electronic substrate 30 side (upper side), overlaps the through hole 34 as viewed in the axial direction X (more specifically, such that the substrate-side opening end 56 is accommodated inside the through hole 34 as viewed in the axial direction X).

According to the on-vehicle brushless motor device 1, since the holder 52 includes the guide hole 54, the coil wire 20 can be guided upward from the brushless motor 10 side (lower side) of the holder 52, and further, the coil wire 20 can be guided to the through hole 34 of the electronic substrate 30. Therefore, for example, one end of the coil wire 20, which is relatively flexible and has an indefinite shape compared to a rigid member such as a terminal pin, can be smoothly guided to the through hole 34 of the electronic substrate 30. Therefore, it is possible to provide the on-vehicle brushless motor device 1 with improved assemblability. By removing the insulating film of the coil wire 20 of the coil 18 in advance, soldering is facilitated.

Figure 3:
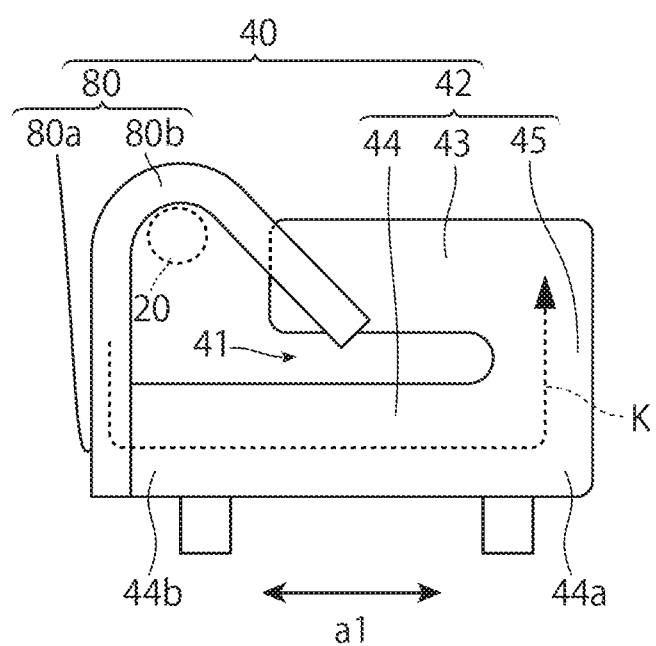
FIG. 3 is a top view illustrating a configuration example of a terminal according to an embodiment.
Figure 4:
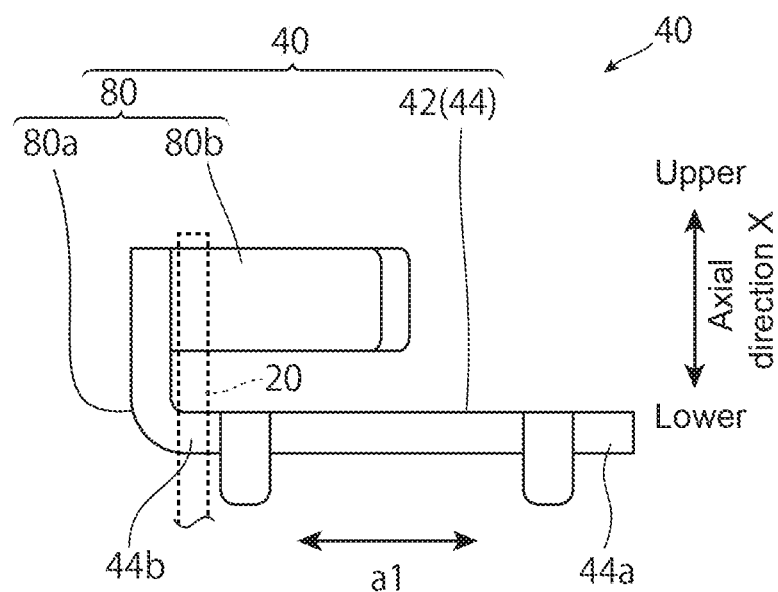
FIG. 4 is a side view illustrating a configuration example of a terminal according to an embodiment.
Figure 5:
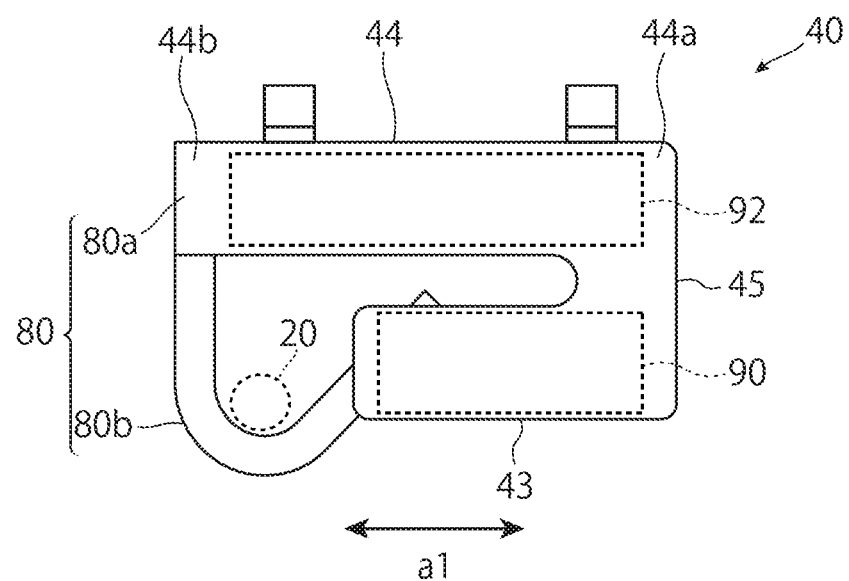
FIG. 5 is a bottom view illustrating a configuration example of a terminal according to an embodiment.

FIGS. 3 to 5 are views illustrating configuration examples of the terminal 40 according to an embodiment. FIG. 3 is a top view (viewed in the axial direction X) of the terminal 40, FIG. 4 is a side view of the terminal 40, and FIG. 5 is a bottom view (viewed in the axial direction X) of the terminal 40. FIGS. 3 to 5 illustrate the terminal 40 in a state before the fusion welding of the terminal 40 and the coil wire 20 is performed.

In some embodiments, for example, as illustrated in FIGS. 3 to 5, in the configuration described above, a first slit 41 extending along a first direction al included in the plane P may be formed in the terminal 40. The terminal 40 includes a first terminal portion 43 provided on one side and a second terminal portion 44 provided on the other side with the first slit 41 interposed therebetween, a third terminal portion 45 connecting the first terminal portion 43 and the second terminal portion 44, and a protruding portion 80 provided to protrude from the second terminal portion 44 to the opposite side to the rotor 12 in the axial direction.

The first terminal portion 43, the second terminal portion 44, and the third terminal portion 45 are formed on a flat plate as a whole and constitute a base portion 42 of the terminal 40. The base portion 42 may be a flat plate-shaped member having, for example, a J-shape, a U-shape, or a V-shape as viewed in the axial direction X, and is disposed parallel to the plane P to face the upper surface 32A of the substrate body 32.

The protruding portion 80 is fusion-welded to the coil wire 20. The first terminal portion 43 is connected to the substrate body 32 via a first soldering portion 90. In this specification, the term "soldering portion" means a solder located between a plurality of members (for example, 2 members) when the members are connected by soldering.

The melting point temperature of a typical lead-free solder is known to be, for example, about 218° C. On the other hand, for example, in fusion welding in which copper is melted, a temperature of about 1000° C. being the melting point of copper or higher is generated, and there is a conceal that the soldering portion may be melted again (remelted) by the heat and the terminal may fall off from the electronic substrate.

According to the on-vehicle brushless motor device 1, the distance along the surface of the terminal 40 from the protruding portion 80 to the first soldering portion 90 (the length along the arrow K in FIG. 3) can be increased while suppressing an increase in the size of the terminal 40. Therefore, it is possible to suppress the heat of welding from being transmitted from the protruding portion 80 to the first soldering portion 90 at the time of fusion welding of the protruding portion 80 and the coil wire 20, and to suppress remelting of the first soldering portion 90. Therefore, it is possible to realize an excellent electrical connection state between the electronic substrate 30 and the coil 18 while suppressing an increase in size of the on-vehicle brushless motor device 1.

In some embodiments, for example, as illustrated in FIG. 5, the second terminal portion 44 includes a second soldering portion 92 soldered to the substrate body 32. The first soldering portion 90 and the second soldering portion 92 are separated from each other. The first soldering portion 90 and the second soldering portion 92 are arranged to extend in parallel with each other with the first slit 41 interposed therebetween.

According to this configuration, the coil 18 and the electronic substrate 30 can be electrically connected to each other via the first soldering portion 90 and the second soldering portion 92. Further, since the first soldering portion 90 and the second soldering portion 92 are separated from each other, even if the second soldering portion 92 is remelted by the heat of welding of the protruding portion 80 and the coil wire 20, the remelting of the first soldering portion 90 can be suppressed. Accordingly, an excellent electrical connection state between the electronic substrate 30 and the coil 18 can be realized.

In some embodiments, for example, as illustrated in FIGS. 3 to 5, the third terminal portion 45 is connected to one end portion 44a of the second terminal portion 44 in the first direction al and the protruding portion 80 is connected to the other end portion 44b of the second terminal portion 44 in the first direction al.

According to this configuration, the distance along the surface of the terminal 40 from the protruding portion 80 to the third terminal portion 45 can be increased. Therefore, the distance along the surface of the terminal 40 from the protruding portion 80 to the first soldering portion 90 can be increased while suppressing an increase in the size of the terminal 40. Therefore, it is possible to effectively suppress the heat of welding from being transmitted from the protruding portion 80 to the first soldering portion 90 at the time of fusion welding of the protruding portion 80 and the coil wire 20, and to suppress remelting of the first soldering portion 90.

In some embodiments, for example, as illustrated in FIGS. 3 and 4, the protruding portion 80 includes a base end portion 80a connected to the other end portion 44b of the second terminal portion 44 and a hook portion 80b formed in a hook shape and engaged with the coil wire 20. In the illustrated exemplary embodiment, the base end portion 80a is formed in a flat plate shape along a plane intersecting the arrow al (a plane orthogonal to the arrow al in the illustrated embodiment). The hook portion 80b extends from the base end portion 80a and is formed in a curved or bent plate shape. The hook portion 80b may be bent such that the distal end thereof is folded back toward the second terminal portion 44 side to surround the coil wire 20 protruding from the upper surface 32A of the substrate body 32. In the terminal 40 configured as described above, the base portion 42 and the protruding portion 80 may be integrally formed of the same member.

According to the on-vehicle brushless motor device 1 having such a configuration, it is possible to secure a long distance from the hook portion 80b disposed at the distal end of the protruding portion 80 and fusion-welded to the coil wire 20 to the first terminal portion 43 via the base end portion 80a of the protruding portion 80, the second terminal portion 44, and the third terminal portion 45. Therefore, it is possible to suppress heat generated when the hook portion 80b and the coil wire 20 are welded from being transmitted to the first soldering portion 90.

Figure 6:
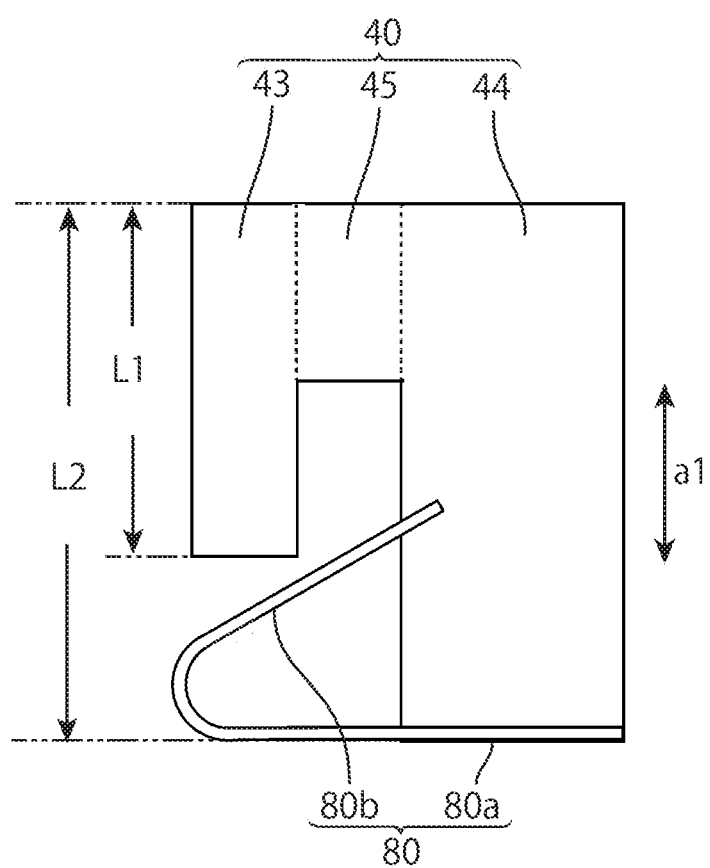
FIG. 6 is a plan view schematically illustrating a configuration example of a teiminal according to an embodiment.

FIG. 6 is a plan view schematically illustrating a configuration example of the terminal 40 illustrated in FIG. 3.

In some embodiments, for example, as illustrated in FIG. 6, in the configuration that the terminal 40 includes the first terminal portion 43 and the second terminal portion 44, the length L2 of the second terminal portion 44 in the first direction al may be longer than the length L1 of the first terminal portion 43 in the first direction al.

According to the on-vehicle brushless motor device 1 having such a configuration, since the distance along the surface of the terminal 40 from the protruding portion 80 to the first soldering portion 90 can be increased, it is possible to suppress the first soldering portion 90 from being remelted by the heat of welding of the protruding portion 80 and the coil wire 20.

Figure 7:
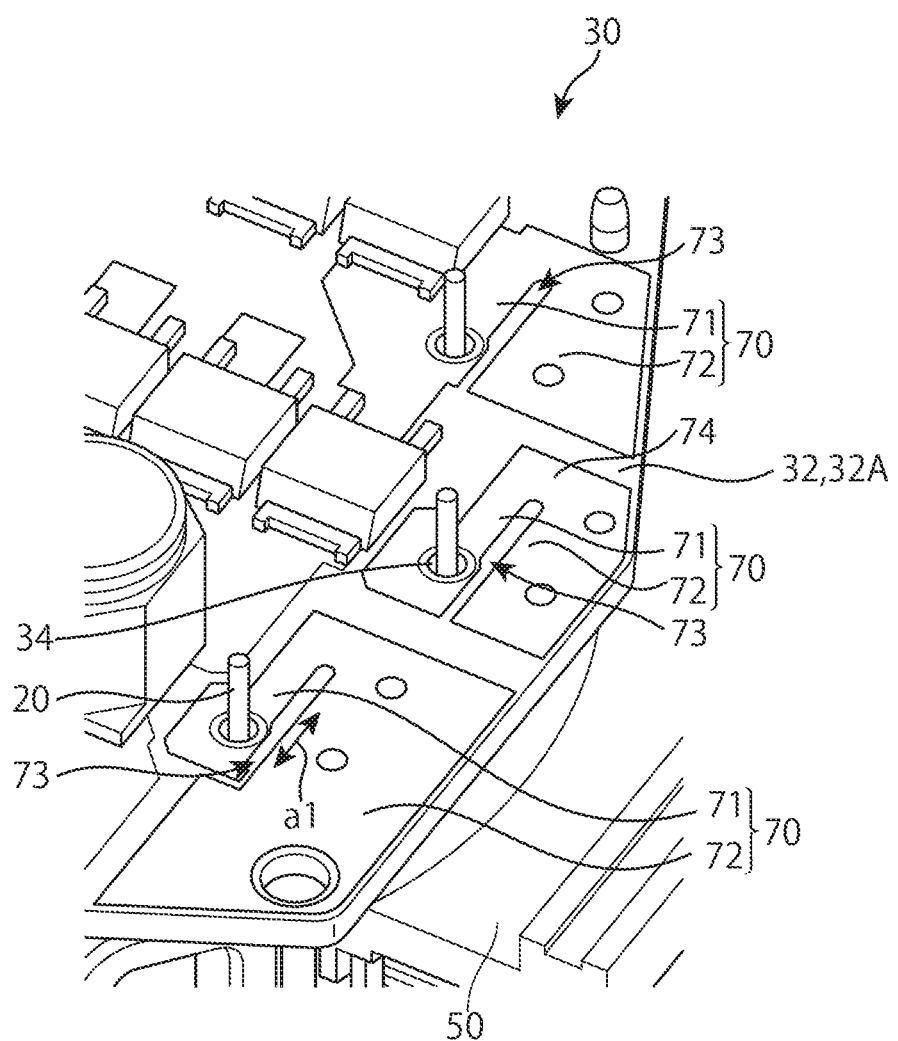
FIG. 7 is a perspective view schematically illustrating a metal foil terminal portion according to an embodiment.
Figure 8:
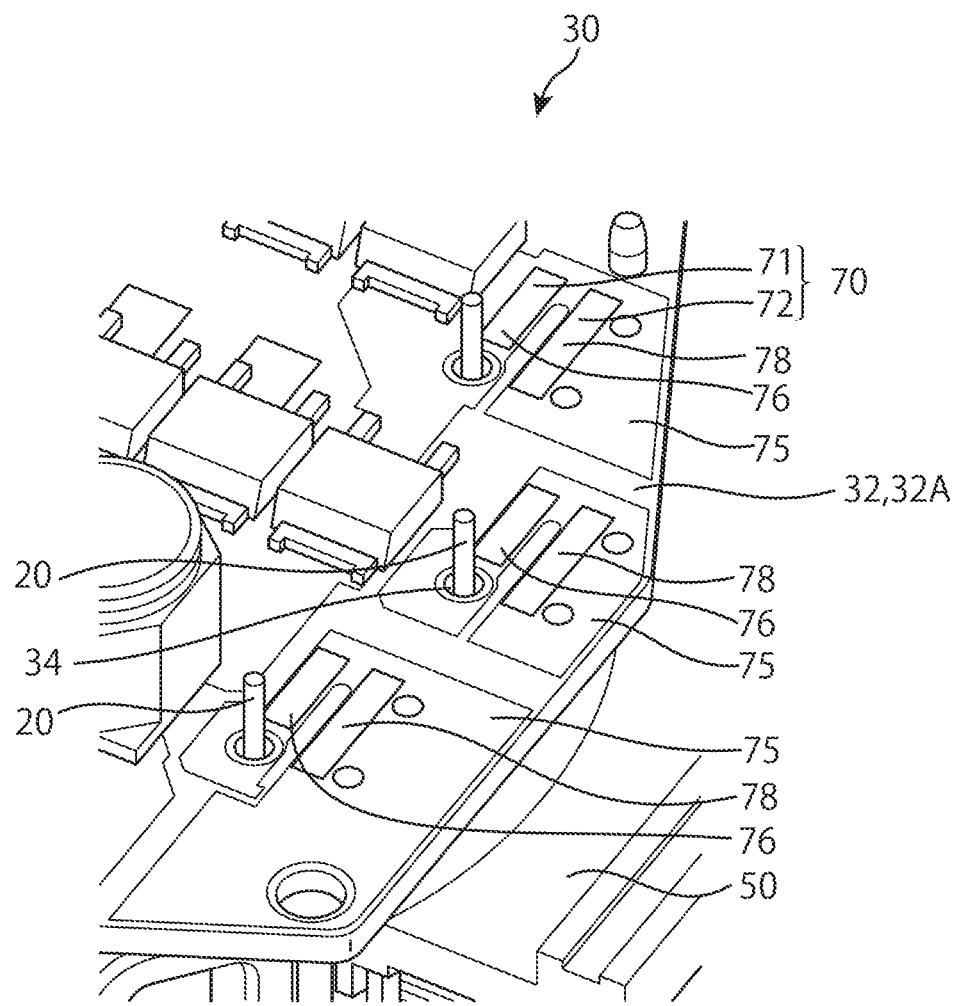
FIG. 8 is a perspective view schematically illustrating a first opening and a second opening of a resist according to an embodiment.
Figure 9:
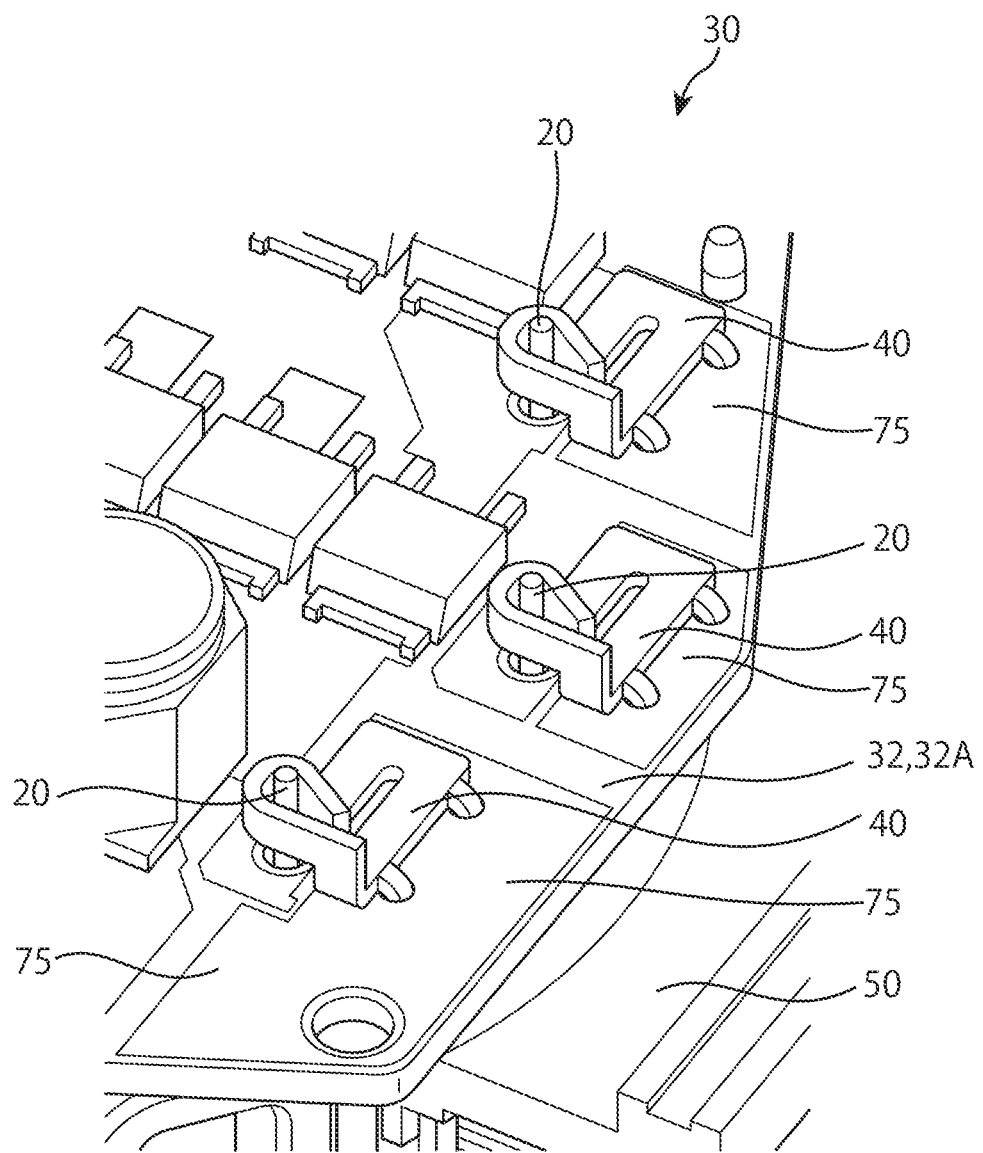
FIG. 9 is a perspective view schematically illustrating a state in which a terminal according to an embodiment is mounted on a substrate body.
Figure 10:
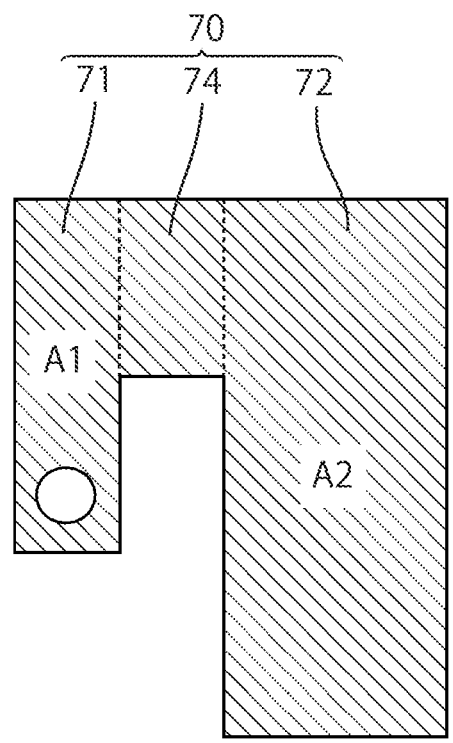
FIG. 10 is a plan view schematically illustrating a configuration example of a metal foil terminal portion according to an embodiment.

FIG. 7 is a perspective view schematically illustrating the metal foil terminal portion 70 in an embodiment. FIG. 8 is a perspective view schematically illustrating a first opening 76 and a second opening 78 of a resist 75 in an embodiment. FIG. 9 is a perspective view schematically illustrating a state in which the terminal 40 is mounted on the substrate body 32 in an embodiment. FIG. 10 is a plan view schematically illustrating a configuration example of the metal foil terminal portion 70 in an embodiment.

In some embodiments, in the configuration including the first soldering portion 90 and the second soldering portion 92, for example, as illustrated in FIGS. 7 to 10, the electronic substrate 30 may include the metal foil terminal portion 70 adjacent to the through hole 34 and disposed along the surface 32A of the substrate body 32 opposite to the rotor 12, and the resist 75 disposed on the metal foil terminal portion 70 and having the first opening 76 corresponding to the first soldering portion 90 and a second opening 78 corresponding to the second soldering portion 92.

For example, as illustrated in FIG. 7, a second slit 73 extending along the first direction al is formed in the metal foil terminal portion 70. That is, the slit 41 and the slit 73 extend along the same direction. The metal foil terminal portion 70 includes a first portion 71, a second portion 72, and a third portion 74. As illustrated in FIGS. 7 and 8, the first portion 71 is provided on one side and the second portion 72 is provided on the other side with the second slit 73 having one end opened interposed therebetween. The first portion 71 is connected to the first soldering portion 90 (see FIG. 5) in the first opening 76. Thus, the first portion 71 is connected to the first terminal portion 43 via the first soldering portion 90 located in the first opening 76. The second portion 72 is connected to the second soldering portion 92 (see FIG. 5) in the second opening 78. Thus, the second portion 72 is connected to the second terminal portion 44 via the second soldering portion 92 located in the second opening 78.

The metal foil terminal portion 70 may be a flat plate-shaped member having, for example, a J-shape, a U-shape, or a V-shape as viewed in the axial direction X, and is disposed parallel to the plane P to face the upper surface 32A of the substrate body 32.

The second portion 72 functions as a heat sink that dissipates heat generated during welding of the hook portion 80b and the coil wire 20. The first portion 71 and the second portion 72 may be disposed to extend in parallel to each other with the second slit 73 interposed therebetween.

According to the on-vehicle brushless motor device 1 having such a configuration, in the transmission path of heat generated by welding of the hook portion 80b and the coil wire 20, most of the heat can be radiated in the second portion 72 before the first soldering portion 90. Therefore, even if the second soldering portion 92 is remelted by the heat generated by welding of the hook portion 80b and the coil wire 20, the electrical connection between the electronic substrate 30 (more specifically, the metal foil terminal portion 70) and the coil 18 can be ensured at least via the first soldering portion 91. Therefore, an excellent electrical connection state between the electronic substrate 30 and the coil 18 can be realized.

In some embodiments, for example, as illustrated in FIG. 10, the area A2 of the second portion 72 may be larger than the area A1 of the first portion 71. In this case, the area A2 of the second portion 72 may be 1.2 times or more the area A1 of the first portion 71. More preferably, the area A2 of the second portion 72 may be 1.4 times or more the area A1 of the first portion 71.

According to the on-vehicle brushless motor device 1 having such a configuration, in the transmission path of the heat generated by welding of the hook portion 80b and the coil wire 20, most of the heat can be radiated in the second portion 72 having the area A2 larger than that of the first portion 71 or having the area A2 equal to or larger than 1.2 times that of the first portion 71 before the first terminal portion 43 to the first soldering portion 90. Thus, even if the second soldering portion 92 is remelted by the heat of welding of the protruding portion 80 and the coil wire 20, the remelting of the first soldering portion 90 can be suppressed. Therefore, the electrical connection between the electronic substrate 30 (more specifically, the metal foil terminal portion 70) and the coil 18 can be more reliably ensured via at least the first soldering portion 90. Accordingly, it is possible to efficiently suppress a decrease in yield of the on-vehicle brushless motor device 1.

In some embodiments, for example, as illustrated in FIG. 9, in any one of the configurations described above, the electronic substrate 30 may include a plurality of terminals 40. The terminals 40 may be configured to be oriented in the same direction with respect to the substrate body 32.

Specifically, for example, the electronic substrate 30 may be configured such that the directions of the first terminal portion 43, the second terminal portion 44, the protruding portion 80, and the hook portion 80b with respect to the substrate body 32 are unified in the respective terminals 40.

According to the on-vehicle brushless motor device 1 having such a configuration, each terminal 40 can be automatically mounted on the substrate body 32 by using, for example, a mounter device (automatic assembly device) (not illustrated). Further, since the orientation of the mounter device or the substrate body 32 does not needs to be changed when each terminal 40 is mounted, the time required for assembling can be shortened. Accordingly, it is possible to provide an on-vehicle brushless motor with improved assemblability. Further, the on-vehicle brushless motor device 1 can be assembled at low cost.

Figure 11:
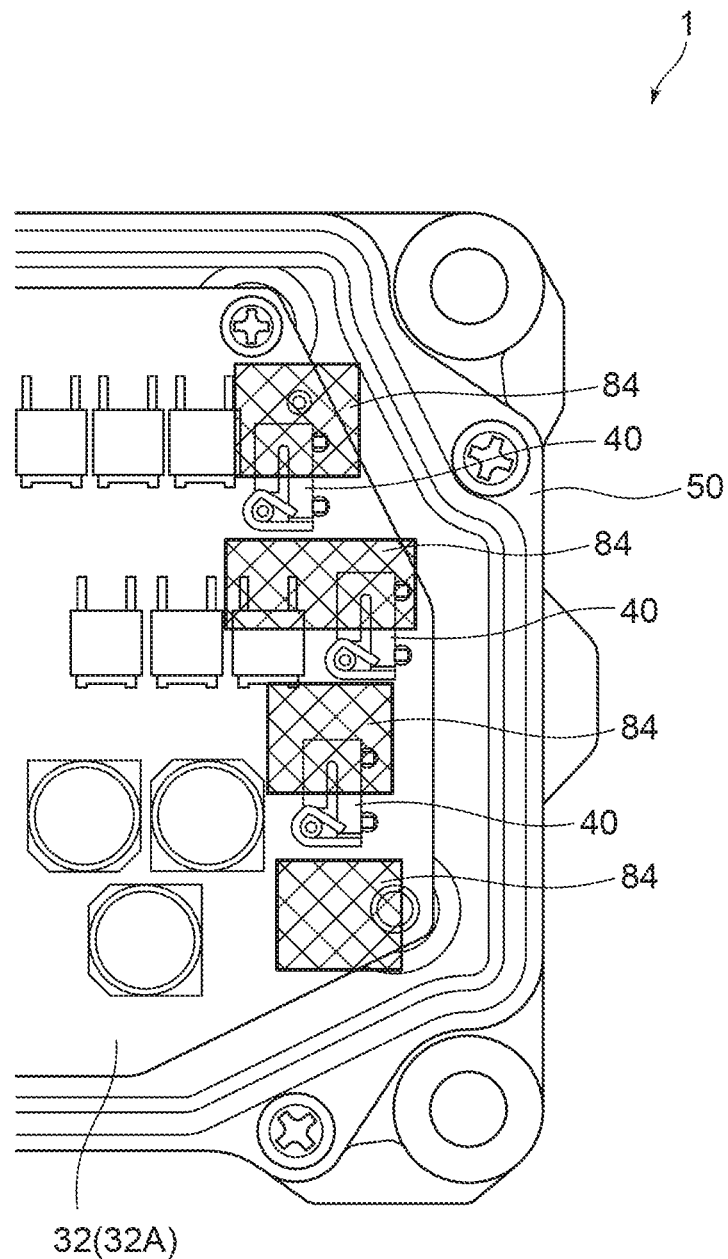
FIG. 11 is a plan view schematically illustrating a region above an electronic substrate according to an embodiment.
Figure 12:
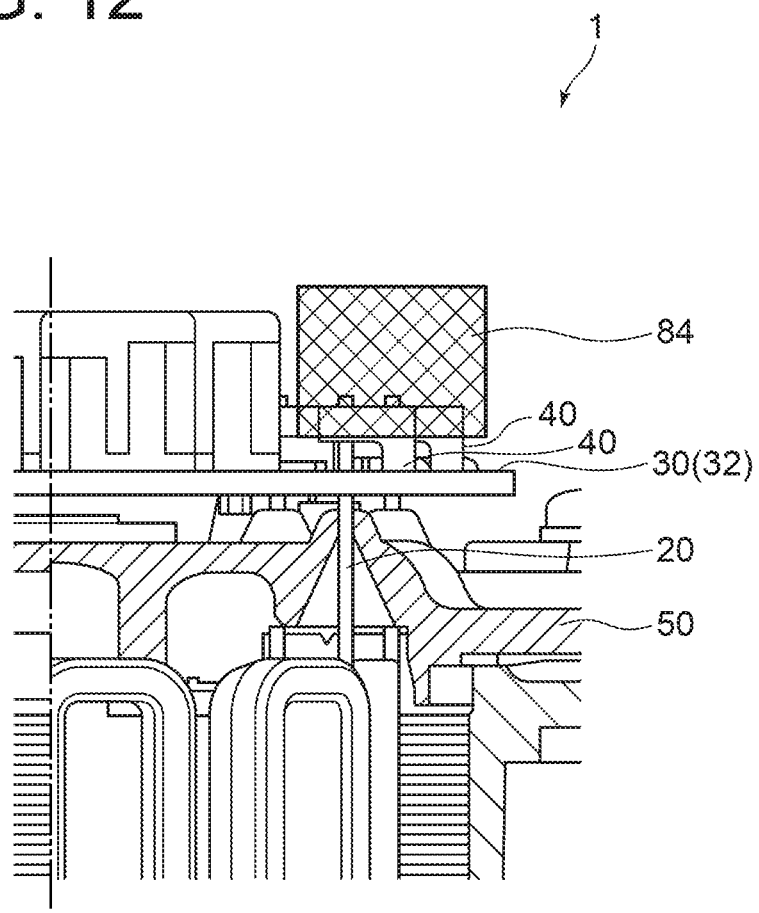
FIG. 12 is a side view schematically illustrating a region above an electronic substrate according to an embodiment.

FIG. 11 is a plan view schematically illustrating a region above the electronic substrate 30 in an embodiment. FIG. 12 is a side view schematically illustrating a region above the electronic substrate 30 in an embodiment.

According to the above-described on-vehicle brushless motor device 1 of the present disclosure, for example, as illustrated in FIGS. 11 and 12, a tool area 84 for an electrode of a fusing device for performing fusion welding is secured above the electronic substrate 30. Therefore, it is possible to suppress the interference between the parts arranged around the terminal 40 and the electrode of the fusing device, and to improve the assemblability of the on-vehicle brushless motor device 1.

Figure 13:
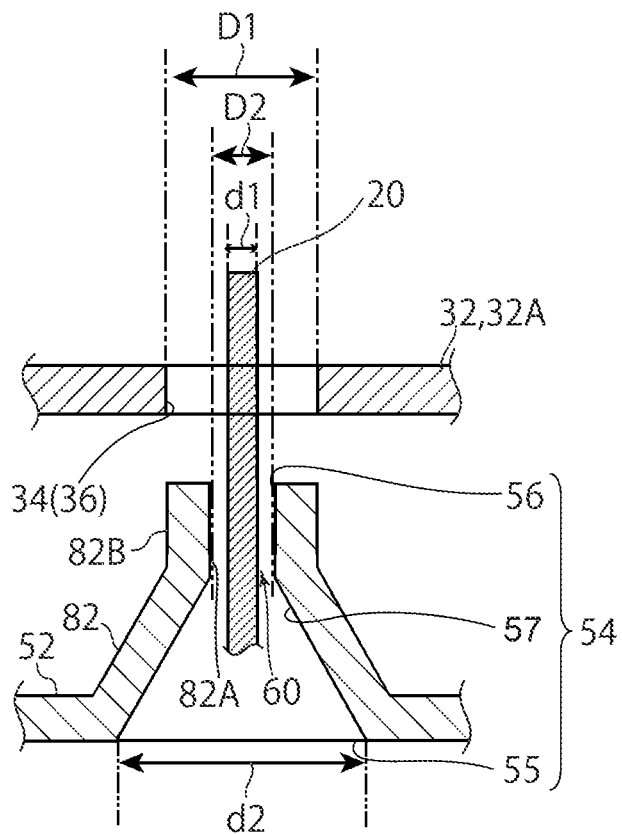
FIG. 13 is a schematic view schematically illustrating a guide hole according to an embodiment.
Figure 14:
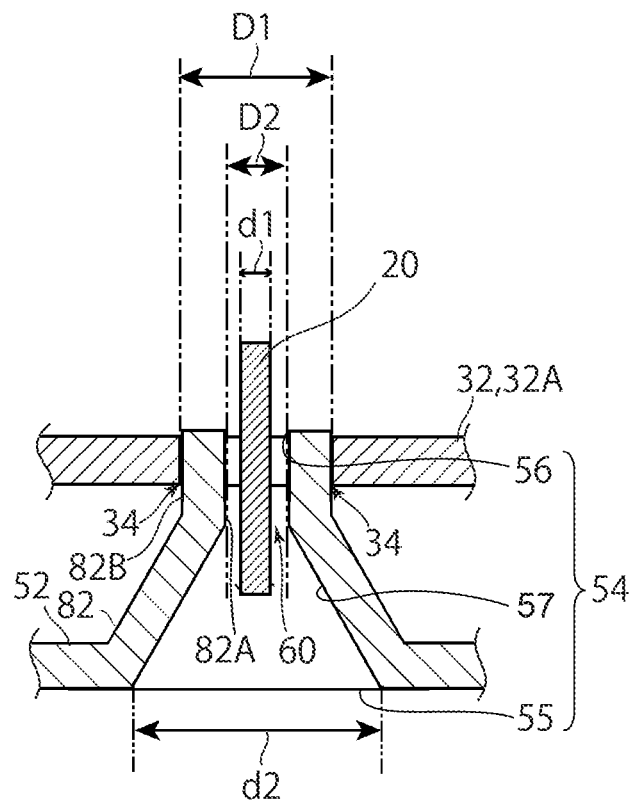
FIG. 14 is a view illustrating a modification of the guide hole according to the embodiment.

FIG. 13 is a side sectional view illustrating a configuration example of the guide hole 54 in an embodiment. FIG. 14 is a side sectional view illustrating a modification of the guide hole 54 in an embodiment.

In some embodiments, for example, as illustrated in FIGS. 2A, 13, and 14, in the on-vehicle brushless motor device 1 in which the holder 52 includes the guide hole 54, the guide hole 54 may include a tapered passage portion 57 formed to be tapered such that the hole diameter (passage diameter) decreases as a distance from the rotor 12 increases in the axial direction X.

Thus, the one end of the coil wire 20 can be smoothly guided to the through hole 34 of the electronic substrate 30 via the tapered passage portion 57. Therefore, it is possible to provide the on-vehicle brushless motor device 1 with improved assemblability. For example, the holder unit 50 on which the electronic substrate 30 is mounted in advance and the coil 18 can be assembled by an automatic assembling apparatus. Subsequently, by performing fusion welding of the hook portion 80b and the coil wire 20, the electronic substrate 30 and the coil 18 can be electrically connected to each other.

A motor-side opening end 55, which is an opening end of the guide hole 54 on the brushless motor 10 side, has a diameter sufficiently larger than the diameter of the coil wire 20. Specifically, as illustrated in FIG. 13 and FIG. 14, the motor-side opening end 55 may be configured to satisfy $3 \leq d2/d1$, where d1 is the diameter of the coil wire 20 and d2 is the diameter of the motor side opening end 55 (the inner diameter of the motor-side opening end 55). The "diameter of the motor-side opening end 55" means the hole diameter (passage diameter) of the guide hole 54 at the position of the motor-side opening end 55.

In some embodiments, for example, as illustrated in FIGS. 13 and 14, the guide hole 54 may include a substrate-side passage portion 60 having a passage diameter that is uniform in the axial direction. In the illustrated embodiment, the substrate-side passage portion 60 is configured to connect the substrate-side opening end 56 and the upper end of the tapered passage portion 57.

As a result, when the coil wire 20 guided by the guide hole 54 passes through the substrate-side passage portion 60, it is possible to give upward directivity to the coil wire 20. Therefore, the coil wire 20 can be more easily and smoothly guided toward the through hole 34 of the electronic substrate 30. In another embodiment, the guide hole 54 may have the tapered passage portion 57 extending from the motor-side opening end 55 to the substrate-side opening end 56. That is, the lower end of the tapered passage portion 57 may be the motor-side opening end 55, and the upper end of the tapered passage portion 57 may be the substrate-side opening end 56.

In some embodiments, for example, as illustrated in FIGS. 13 and 14, the holder 52 may include a cylindrical portion 82 protruding toward the opposite side of the rotor 12.

In this case, at least a part of the guide hole 54 is formed by the inner peripheral surface 82A of the cylindrical portion 82. In this case, the substrate-side opening end 56, which is the upper end of the inner peripheral surface 82A of the cylindrical portion 82, may be disposed below the through hole 34 as illustrated in FIG. 13, may be disposed inside the through hole 34, may be arranged flush with the upper surface 32A of the electronic substrate 30 as illustrated in FIG. 4, or may be disposed above the upper surface 32A of the electronic substrate 30. Further, as illustrated in FIG. 14, at least a part of a cylindrical substrate-side portion 82B of the cylindrical portion 82, which forms the substrate-side passage portion 60 on the inner peripheral surface thereof, may be disposed inside the through hole 34.

As illustrated in FIG. 14, by disposing the substrate-side portion 82B of the cylindrical portion 82 inside the through hole 34, the one end of the coil wire 20 can be smoothly guided by the through hole 34 of the electronic substrate 30. Therefore, it is possible to provide the on-vehicle brushless motor device 1 with improved assemblability.

In some embodiments, for example, as illustrated in FIGS. 13 and 14, in the on-vehicle brushless motor device 1 in which the guide hole 54 includes the tapered passage portion 57, the diameter D2 of the substrate-side opening end 56 (the inner diameter of the substrate-side opening end 56) may be smaller than the diameter D1 of the through hole 34. According to the on-vehicle brushless motor device 1 having the above-described structure, the coil wire 20 having passed through the substrate-side opening end 56 may be more easily and smoothly guided to the through hole 34 of the electronic substrate 30. The "diameter of the substrate-side opening end 56" means the hole diameter (passage diameter) of the guide hole 54 at the position of the substrate-side opening end 56.

Next, a method of manufacturing an on-vehicle brushless motor device according to an embodiment of the present disclosure will be described. FIG. 15 is a flowchart illustrating a method of manufacturing an on-vehicle brushless motor device according to an embodiment. As shown in FIG. 15, the method of manufacturing the on-vehicle brushless motor device 1 includes step S1 of arranging the substrate body 32 of the electronic substrate 30 along a plane P intersecting the axial direction X on the side opposite to the output side of the brushless motor 10, step S2 of passing the coil wire 20 of the coil 18 constituting the stator 16 of the brushless motor 10 through the through hole 34 of the electronic substrate 30, and step S3 of welding the coil wire 20 to the hook portion 80b of the terminal 40 fixed on the surface 32A of the substrate body 32 opposite to the rotor 12 with respect to the electronic substrate 30.

In step S1, for example, the electronic substrate 30 on which various electronic components for controlling drive of the brushless motor 10 are mounted is disposed on the upper surface of the holder unit 50 that partitions the space in which the brushless motor 10 is disposed and the space in which the electronic substrate 30 is disposed. At this time, for example, the electronic substrate 30 may be disposed such that the through hole 34 formed in the electronic substrate 30 in advance for allowing the coil wire 20 to pass therethrough and the guide hole 54 formed in the holder unit 50 in advance to guide the coil wire 20 into the through hole 34 overlap each other when viewed in the axial direction X. Further, the third soldering portion 63 for connecting the one end 58A of the connector terminal 58 and the metal foil terminal portion 85 is formed.

As a pre-process of step S1, the metal foil terminal portion 70 is provided on the substrate body 32, and the resist 75 is disposed on the metal foil terminal portion 70. Then, the first portion 71 exposed inside the first opening 76 and the first terminal portion 43 are connected by soldering to form the first soldering portion 90. Further, the second portion 72 exposed inside the second opening 78 and the second terminal portion 44 are connected by soldering to form the second soldering portion 92.

In step S2, for example, the one end of the coil wire 20 is passed through the through hole 34 by guiding the coil wire 20 along the tapered passage portion 57 that is formed in advance in the holder 52 of the holder unit 50, as the guide hole 54, so that the diameter of thereof decreases from the lower surface side toward the upper surface side of the holder 52.

In step S3, for example, one end of the coil wire 20 protruding to the upper side of the electronic substrate 30 through the through hole 34 is disposed so that the one end faces upward, and the coil wire 20 and the terminal 40 are fusion-welded so that the coil wire 20 is disposed inside the hook portion 80b. Further, the metal foil terminal portion 70 is provided on the substrate body 32, and the resist 75 is arranged on the metal foil terminal portion 70. The first soldering portion 90 is soldered to the first portion 71 exposed inside the first opening 76. The second soldering portion 92 is soldered to the second portion 72 exposed inside the second opening 78.

According to the method of manufacturing the on-vehicle brushless motor device 1, as described above, the coil wire 20 of the coil 18 passes through the through hole 34 of the substrate body 32 and is directly fusion-welded to the terminal 40 on the side opposite to the rotor 12. Therefore, it is possible to provide the on-vehicle brushless motor device 1 that can be downsized in the axial direction X compared to a case where the coil 18 and the electronic substrate 30 are connected to each other via a rigid component such as a terminal pin. Further, the number of welding points can be reduced as compared with the case where the coil 18 and the electronic substrate 30 are connected to each other via the terminal pin. Therefore, the on-vehicle brushless motor device 1 can be easily manufactured.

According to at least one embodiment of the present disclosure, it is possible to provide an on-vehicle brushless motor device which can be miniaturized in the axial direction of the rotor and a method of manufacturing the same.

The present invention is not limited to the above-described embodiments, and includes modifications of above-described embodiments and combinations of these embodiments.

For example, in some embodiments described above, although the electric oil pump 1A (oil supply device) mounted with the brushless motor 10 has been described as an example of the on-vehicle brushless motor device 1, the in-vehicle brushless motor device 1 of the present disclosure is not limited thereto and can be applied to, for example, an electronically controlled variable valve timing system (VVT), an electric water pump (EWP), a parking lock actuator (PLA), and the like each mounted with the brushless motor 10.

The invention claimed is:

1. An on-vehicle brushless motor device, comprising:
a brushless motor including a rotor and a stator which include a plurality of coils arranged around the rotor; and
an electronic substrate including a substrate body provided with a through hole penetrating in the axial direction of the rotor and arranged along a plane intersecting the axial direction on the side opposite to the output side of the brushless motor, and a terminal fixed on a surface of the substrate body opposite to the rotor,
a coil wire of the coil being inserted through the through hole and welded to the terminal on a side opposite to the rotor with respect to the substrate body,
wherein a first slit extending along a first direction included in the plane is formed in the terminal,
the terminal includes a first terminal portion provided on one side and a second terminal portion provided on the other side with the first slit interposed therebetween, a third terminal portion connecting the first terminal portion and the second terminal portion, and a protruding portion provided to protrude from the second terminal portion to the opposite side to the rotor in the axial direction,
the protruding portion is welded to the coil wire, and
the first terminal portion is connected to the substrate body via a first soldering portion.

2. The on-vehicle brushless motor device according to claim 1,
wherein the second terminal portion is connected to the substrate body via a second soldering portion, and the first soldering portion and the second soldering portion are separated from each other.

3. The on-vehicle brushless motor device according to claim 2,
wherein the electronic substrate includes a metal foil terminal portion arranged adjacent to the through hole and disposed along a surface of the substrate body opposite to the rotor, and a resist disposed on the metal foil terminal portion and including a first opening corresponding to the first soldering portion and a second opening corresponding to the second soldering portion,
a second slit extending in the first direction is formed in the metal foil terminal portion, and
the metal foil terminal portion includes a first portion provided on one side and a second portion provided on the other side with the second slit interposed therebetween, and a third portion connecting the first portion and the second portion, the first portion being connected to the first soldering portion in the first opening and the second portion being connected to the second soldering portion in the second opening.

4. The on-vehicle brushless motor device according to claim 3, wherein an area of the second portion is larger than an area of the first portion.

5. The on-vehicle brushless motor device according to claim 4, wherein the area of the second portion is 1.2 times or more the area of the first portion.

6. The on-vehicle brushless motor device according to claim 1,
wherein the third terminal portion is connected to one end portion of the second terminal portion in the first direction, and the protruding portion is connected to the other end portion of the second terminal portion in the first direction.

7. The on-vehicle brushless motor device according to claim 1,
wherein the protruding portion includes a hook portion formed in a hook shape and welded to the coil wire by fusing.

8. The on-vehicle brushless motor device according to claim 1,
wherein the length of the second terminal portion in the first direction is longer than the length of the first terminal portion in the first direction.

9. The on-vehicle brushless motor device according to claim 1,
wherein the electronic substrate includes a plurality of the terminals, and the terminals are oriented in the same direction with respect to the substrate body.

10. The on-vehicle brushless motor device according to claim 1, further comprising a holder unit including a connector terminal for connecting the electronic substrate and an external device and a holder disposed between the substrate body and the brushless motor to support the electronic board,
wherein the electronic substrate includes a third soldering portion for being connected to the connector terminal.

11. The on-vehicle brushless motor device according to claim 10,
wherein the holder includes a guide hole penetrating the holder in the axial direction and guiding the coil wire from the brushless motor side to the through hole of the substrate body.

12. The on-vehicle brushless motor device according to claim 11,
wherein the guide hole includes a tapered passage portion formed such that a hole diameter decreases as a distance from the rotor in the axial direction increases.

13. The on-vehicle brushless motor device according to claim 11, wherein the diameter of an opening end of the guide hole on the electronic substrate side is smaller than the diameter of the through hole.

* * * * *